May 22, 1951
G. E. DEY
2,553,639
ESCUTCHEON FOR HANDLES
Filed May 29, 1947
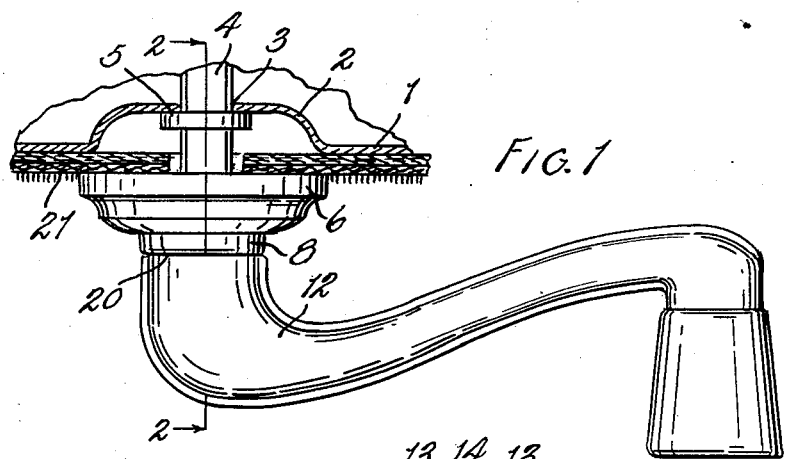
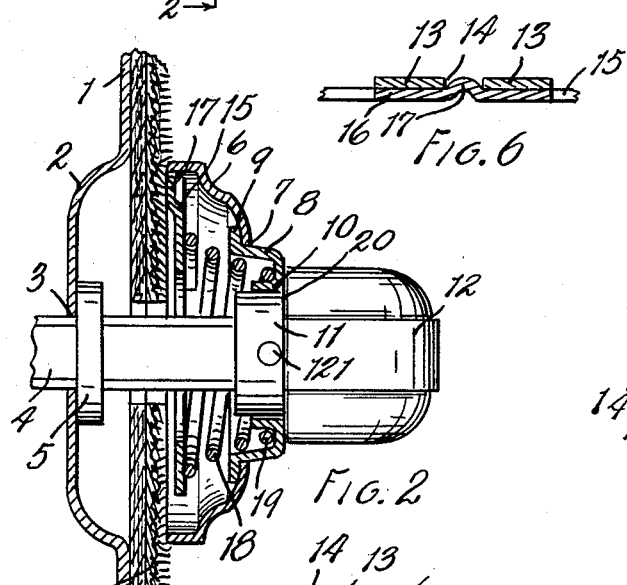
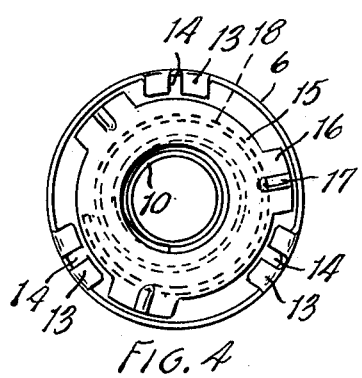
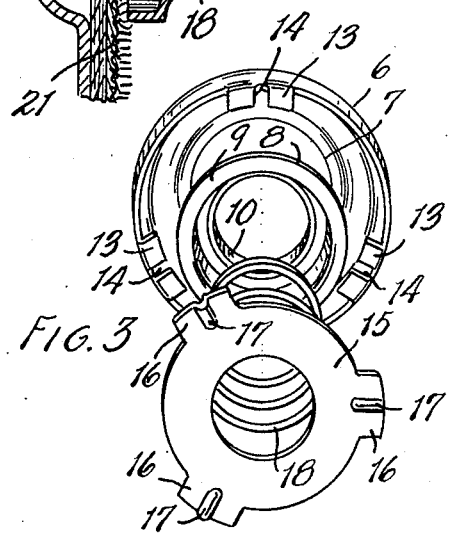
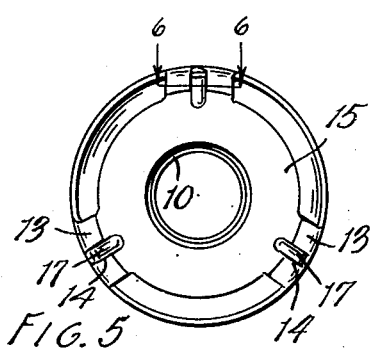
INVENTOR.
George E. Dey
BY
ATTORNEY Patented May 22, 1951

2,553,639

UNITED STATES PATENT OFFICE 2,553,639

ESCUTCHEON FOR HANDLES

George E. Dey, Grand Rapids, Mich., assignor to Doehler-Jarvis Corporation, Grand Rapids, Mich., a corporation of Michigan Application May 29, 1947, Serial No. 751,381

7 Claims. (Cl. 292—357)

This invention relates to improvements in escutcheons for handles such as motor vehicle door handles, remote control handles and the like.

The main objects of this invention are:

First, to provide an escutcheon for remote control handles for motor vehicle doors, windows and the like which is simple in its parts, easily assembled and easily installed in connection with a handle and at the same time is very attractive in appearance.

Second, to provide a structure of the class described which maintains its proper association with the surface on which the handle is mounted and also relative to the handle.

Third, to provide a structure having these advantages which may be economically produced and assembled and permits the ready assembly of the handle on the control spindle.

Objects relating to details and economies of the invention will appear from the description to follow. The invention is defined and pointed out in the claims.

A preferred embodiment of the invention is illustrated in the accompanying drawing, in which:

Fig. 1 is a plan view of a handle having the escutcheon of the invention associated therewith, the handle spindle being partially broken away and associated wall parts being shown in section.

Fig. 2 is an enlarged view mainly in section on a line corresponding to line 2—2 of Fig. 1.

Fig. 3 is a dis-assembled or exploded view of parts viewed from the rear thereof.

Fig. 4 is a rear view illustrating the steps in the assembly of the thrust plate with the body member of the escutcheon.

Fig. 5 is a rear view of the assembled escutcheon.

Fig. 6 is an enlarged fragmentary view in section on a line corresponding to line 6—6 of Fig. 5.

In the accompanying drawing, I have illustrated the invention as embodied in an inside remote control handle for automobile doors but it will be understood that the invention has a wide adaptation to other types of handles, levers, controls and the like.

Referring to the accompanying drawing, 1 represents the door panel of an automobile or other mounting panel having a recess 2 therein which is apertured at 3 to receive the spindle 4 having a thrust collar or stop 5 thereon.

The escutcheon of the invention comprises a base or body member 6 cupped and having suitable ornamental configuration. This body member is open at the bottom and has a central opening 7 in the top thereof receiving the top member 8 which is axially movable in the opening 7, the outward movement being limited by the outturned flange 9 on the inner end of the top member.

The top member is provided with a central opening surrounded by an inturned flange 10 adapted to receive the hub 11 of the handle 12 which is secured to the spindle 4 by means of the pin 121. The body member is provided with angularly spaced inturned lugs 13 slotted or recessed at 14 for a purpose to be pointed out.

The thrust plate 15, preferably angular, is provided with radially projecting angularly spaced lugs 16 spaced to correspond to the lugs 13, the lugs 16 having bosses 17 struck downwardly therefrom and adapted to engage the slots or recesses 14 of the lugs 13.

The conical helically coiled spring 18 is supported by the thrust plate which is preferably annular, as illustrated, the outer small coil 19 of the spring embracing the flange 10 of the top member.

In assembling, the top member is inserted through the base or body member from the bottom thereof with its flange 9 in internal engagement with the body member. The spring is then inserted and the thrust plate introduced within the body member and given a rotative movement or the body member and thrust plate are rotatively adjusted to position the lugs of the thrust plate in engagement with the lugs of the body member with the bosses 17 in engagement with the recesses 14.

The spring serves the double purpose or function of retaining the lugs of the body member and thrust spring in engagement and yieldingly urging the body and top members of the escutcheon outwardly relative to each other—the top member into engagement with the shoulder 20 of the handle and the body member into engagement with the upholstery 21.

In assembling the handle and escutcheon on the spindle, the escutcheon is placed over the spindle and the top member of the escutcheon depressed against the tension of the spring so as to expose the opening in the handle hub and permit the introduction of the pin 121. When the pin has been inserted, the top member of the escutcheon is urged against the shoulder 20 of the handle and, as stated, the base member is suitably urged against the upholstery. Should occasion require, the parts may be readily disassembled.

If desired, the escutcheon may be shipped from the factory in knock-down condition and can be readily assembled on an assembly line or the escutcheon may be completely assembled and delivered in the assembly line in that condition and readily installed with the handle.

I have not attempted to illustrate or describe certain other modifications and adaptations which I contemplate as it is believed that this disclosure will enable those skilled in the art to embody or adapt the invention as may be desired.

Having thus described my invention, what I claim as new and desire to secure by Letters Patent, is:

1. In an escutcheon of the class described, the combination of an annular cupped body member having a central opening in the top thereof and having angularly spaced slotted lugs turned inwardly from the inner edge thereof, a cupped top member disposed through the opening in the top of said body member and having an out-turned flange at its inner end engaged within the body member, said top member having an opening in its outer end surrounded by an inturned flange, a thrust plate provided with radial lugs engageable with said lugs of said body member by a relative rotative movement of the body and the thrust plate, the lugs of the thrust plate having bosses struck up therefrom engageable with the slots of the lugs of the body member, and a helically coiled conical spring seated on said thrust plate with its outer coil in thrust engagement with said top member and in positioning engagement with said inturned flange thereof whereby the spring acts to urge the top and body member yieldingly outward and to maintain the lugs of the thrust plate in engagement with the lugs of the body member, the wall of the body member being axially spaced from the lugs of the thrust plate to facilitate movement of the bosses of said lugs into and out of the slots of the slotted lugs of the body member upon relative rotative movement of the body member and thrust plate.

2. In an escutcheon of the class described, the combination of an annular cupped body member having a central opening in the top thereof and having angularly spaced slotted lugs turned inwardly from the inner edge thereof, a cupped top member disposed through the opening in the top of said body member and having an out-turned flange at its inner end engaged within the body member, said top member having an opening in its outer end surrounded by an inturned flange, a thrust plate provided with radial lugs having axially projecting portions, retainingly engageable in the slots of said lugs of said body member by a relative rotative movement of the body and the thrust plate, and a helically coiled spring seated on said thrust plate with its outer coil in thrust engagement with said top member and in positioning engagement with said inturned flange thereof whereby the spring acts to urge the top and body member yieldingly outward and to maintain the lugs of the thrust plate in engagement with the lugs of the body member, the lugs of the body member and the lugs of the thrust plate being movable relative to each other in a direction axially of the body member to facilitate movement of the axially projecting portions of the lugs of the thrust plate into and out of the slots of the slotted lugs of the body member upon relative rotative movement of the body member and thrust plate.

3. In an escutcheon of the class described, the combination of an annular cupped body member having inwardly projecting angularly spaced recessed lugs, a cupped top member disposed through the top of said body member and having an out-turned part at its inner end engaged within the body member, a thrust plate provided with angularly spaced lugs engageable with said lugs of said body member by a relative rotative movement of the body member and thrust plate, the lugs of the thrust plate having bosses struck up therefrom engageable with the recesses of the lugs of the body member, and a spring interposed between said thrust plate and top member and acting to urge the body and top members outwardly and to maintain the lugs of the thrust plate and body member in engagement, the body member and thrust plate being relatively axially movable to permit movement of the bosses of said lugs into and out of the recesses of the lugs of the body member upon relative rotative movement of the body member and thrust plate.

4. In an escutcheon of the class described, the combination of an annular cupped body member having inwardly projecting angularly spaced lugs, a cupped top member disposed through the top of said body member and having an out-turned part at its inner end engaged within the body member, a thrust plate provided with angularly spaced lugs engageable with said lugs of said body member by a relative rotative movement of the body member and thrust plate, and a spring interposed between said thrust plate and top member and acting to urge the body and top members outwardly and to maintain the lugs of the thrust plate and body member in engagement, the lugs of the body member and thrust plate having interengaging parts adapted to be engaged upon rotative movement of said body member and thrust plate, the lugs of the body member and thrust plate being movable relative to each other in a direction axially of the body member to facilitate movement of said interengaging parts into and out of engagement by relative rotative movement of said body member and thrust plate, said interengaging parts including axially projecting portions on one set of lugs retainingly engageable in recesses of the opposed set of lugs.

5. An escutcheon of the class described comprising a chambered body member open at the top and bottom, a top member disposed through the top opening of the body member for axial movement therein and having retaining engagement with the body member, a thrust plate adapted to be inserted into the body member from the inner end thereof, said body member and thrust plate having coacting opposed sets of lugs, the lugs of one set having recesses and the lugs of the other set having axially projecting portions retainingly engageable in said recesses by relative rotative movement of the body member and thrust plate with the thrust plate lying within the inner edge of the body member, and a helically coiled spring interposed between said thrust plate and top member and acting to urge the body and top members outwardly relative to each other and acting to releasably retain their coengaging lugs in engagement, the wall of the body member being axially spaced from the lugs of the thrust plate to facilitate movement of said lugs into and out of engagement by relative rotative movement of the body member and thrust plate.

6. An escutcheon of the class described comprising a chambered body member open at the top and bottom, a top member disposed through the top opening of the body member for axial movement therein and having retaining engagement with the body member, a thrust plate adapted to be inserted into the body member from the inner end thereof, said body member and thrust plate having opposed coacting plate retaining members projecting radially of the body member and thrust plate, and a spring interposed between said thrust plate and top member and acting to urge the body and top member outwardly relative to each other, the body member and thrust plate being relatively axially movable to facilitate movement of said retaining members into and out of engagement by relative rotative and axial movement of said body member and thrust plate, said retaining members including an axially projecting portion on one retaining member engageable in a recess of the opposed retaining member.

7. An escutcheon comprising an annular body member having inwardly projecting angularly spaced lugs at its inner end disposed substantially in a common plane substantially at right angles to the axis of the body member, a top member disposed through the top of the body member for axial movement relative thereto, a thrust plate insertable and removable from the inner end of said body member and having radial lugs disposed substantially in a common plane at right angles to the axis of the thrust member and releasably engageable with the lugs of the body member, one set of lugs having axially projecting portions and the other set having recesses for releasably receiving said projecting portions, and a spring interposed between said thrust plate and top member and acting to yieldably urge them outwardly relative to each other and to maintain said projecting portions in said recesses.

GEORGE E. DEY.

REFERENCES CITED

The following references are of record in the file of this patent:

UNITED STATES PATENTS

| Number | Name | Date |
|---|---|---|
| 1,131,399 | McGinley | Mar. 9, 1915 |
| 1,270,296 | Jeune | June 25, 1918 |
| 2,297,077 | Schlage | Sept. 29, 1942 |

FOREIGN PATENTS

| Number | Country | Date |
|---|---|---|
| 371,166 | Great Britain | Apr. 21, 1932 |
| 383,464 | Great Britain | Nov. 17, 1932 |